United States Patent [19]

Spring

[11] Patent Number: 5,184,504
[45] Date of Patent: Feb. 9, 1993

[54] LEAK DETECTION

[76] Inventor: G. Everett Spring, P.O. Box 1479, Makawao, Maui, Hi. 96768-1479

[21] Appl. No.: 530,613

[22] Filed: May 30, 1990

[51] Int. Cl.⁵ ............................................. G01M 3/32
[52] U.S. Cl. ....................................................... 73/49.2
[58] Field of Search .......... 73/40.5 R, 49.2 T, 49.2 R; 340/605

[56] References Cited

U.S. PATENT DOCUMENTS

| | | | |
|---|---|---|---|
| 3,848,765 | 11/1974 | Durkop | 220/9 A |
| 4,524,609 | 6/1985 | Sharp | 73/492 T |
| 4,568,925 | 2/1986 | Butts | 340/60 S |
| 4,607,522 | 8/1986 | Sharp | 73/492 T |
| 4,648,523 | 3/1987 | Strock | 220/20 S |
| 4,685,327 | 8/1987 | Sharp | 73/49.2 T |
| 4,696,186 | 9/1987 | Sharp | 73/49.2 T |
| 4,708,015 | 11/1987 | Sharp | 73/49.2 T |
| 4,787,772 | 11/1988 | Wagner | 73/49.2 T |
| 4,796,676 | 1/1989 | Hendershot et al. | 73/49.2 T |
| 4,912,966 | 4/1990 | Sharp | 73/49.2 T |

FOREIGN PATENT DOCUMENTS

| | | |
|---|---|---|
| 1120131 | 3/1982 | Canada . |
| 2225456 | 12/1973 | Fed. Rep. of Germany ... 73/49.2 T |
| 2735804 | 2/1979 | Fed. Rep. of Germany ... 73/49.2 T |
| 54-108012 | 8/1979 | Japan ................................ 73/49.2 T |

OTHER PUBLICATIONS

Jacketed Steel Underground Storage Tanks, Total Containment, Inc., Exton, Pa.
Flexible Inner Tank System, World Enviro Systems, Inc., Shawnee, Okla.

*Primary Examiner*—Hezron E. Williams
*Assistant Examiner*—Michael Brock
*Attorney, Agent, or Firm*—Hughes & Multer

[57] ABSTRACT

Methods of and apparatus for detecting the leakage of fluids from containment vessels. The tank is surrounded by or lined with a generally fluidtight envelope, and a vacuum is applied to hold the envelope against the tank and thereby control and limit to a very small volume the space between the primary containment, be it the vessel or liner, and the envelope. Fluids escaping from the containment vessel collect in that space. Collected fluids are evacuated; and fluid withdrawal information is processed, providing an advisory if a leak occurs or continues and/or information on the magnitude of the leak. An indication of a possible leak can also be obtained by monitoring the pressure in the space between the containment vessel and the encapsulating envelope. A trend-bucking change in that pressure is also an indication of a possible leak. Other installations make use of a second system to detect and evaluate leaks into the installation from the surrounding environs.

36 Claims, 8 Drawing Sheets

LEAK DETECTION

TECHNICAL FIELD OF THE INVENTION

The present invention relates to novel, improved methods and apparatus for detecting the leakage of fluids from a variety of containment vessels including tanks and lines and for detecting leakage into systems isolating such vessels from the surrounding environs.

The present invention also relates to novel, improved methods and apparatus for testing new systems for leaks and for measuring the sizes of detected leaks.

BACKGROUND OF THE INVENTION

The release of environmental contaminants from underground storage tanks and associated devices such as piping, fittings, flanges, valves, and pumps by leakage, spills, overfilling, etc. is a serious, pervasive source of environmental pollution and a problem which has been taken up by numerous regulatory agencies.

In the United States, for example, a number of rules and regulations addressing this problem have been promulgated by the Environmental Protection Agency (EPA). Among other things, the EPA standards require that regulated tanks and piping be monitored for the leakage or other release of hazardous substances. This regulation can be complied with by employing a leak detection and monitoring system having the following minimum capabilities for tightness testing of tanks and piping:

| Leak Detection Rate | 0.10 gallon per hour |
| Probability of Detection | $\geq 95$ percent |
| Probability of a False Alarm | $\leq 5$ percent |

Aside from the environmental pollution that results, leaks from containment vessels are undesirable because of the safety hazards and consequent liability the leaked substance may present and/or because of economic factors. For example, as the cost of crude oil increases, the economic penalties appurtenant to leaks of the oil and products refined from it become increasingly severe. Such considerations have led the American Petroleum to recommend a leak detection threshold rate of 0.05 gallons per hours.

A comparable problem exists in aboveground storage systems. Leaks from aboveground tanks, pipes, and other containment vessels cause significant contamination of soil, air, surface water, etc. in the surrounding environment. And, again, no satisfactory system for monitoring such systems and detecting leaks with a satisfactory level of accuracy has been found to currently be available.

A number of patents and other documents of which I am aware disclose leak detection and monitoring systems.

These are:

| Patent Number | Patentee(s) | Issue Date |
| --- | --- | --- |
| U.S. PAT. NOS. | | |
| 3,564,526 | Butts | 16 February 1971 |
| 3,848,765 | Durkop | 19 November 1974 |
| 4,568,925 | Butts | 4 February 1986 |
| 4,602,250 | Peace | 22 July 1986 |
| 4,648,523 | Strock | 10 March 1987 |
| 4,670,847 | Furuse | 2 June 1987 |
| 4,685,327 | Sharp | 11 August 1987 |
| 4,696,186 | Sharp | 29 September 1987 |
| 4,708,015 | Sharp | 24 November 1987 |
| 4,787,772 | Wagner | 29 November 1988 |
| 4,796,676 | Hendershot et al. | 10 January 1989 |
| 4,805,444 | Webb | 21 February 1989 |
| CANADIAN PATENTS | | |
| 775,757 | Hakka et al. | 9 January 1968 |
| 775,758 | Butts | 9 January 1968 |
| 978,614 | Waikowski et al. | 25 November 1975 |
| 1,120,131 | Butts | 16 March 1982 |
| OTHER | | |

Jacketed Steel Underground Storage Tanks, Total Containment, Inc., Exton, PA
Flexible Inner Tank System, World Enviro Systems, Inc., Shawnee, OK It is problematical whether any of the systems disclosed in the above-cited documents would meet the above-identified, current EPA standards let alone the more exacting ones that may be enacted by the EPA or other regulatory agencies in the future or dictated by economic considerations such as a rise in the cost of crude oil. With one or two possible exceptions, the previously proposed systems are capable only of gross leak detection, not the sophisticated leak detection and monitoring required by relevant EPA and other regulations.

Those previously disclosed systems which do appear to have a potential for more than the gross detection of leaks—for example, that disclosed in Hendershot et al.—detect leaks by monitoring a negative pressure in the space between a tank and a flexible tank liner. In each instance, however, the monitoring system is inaccurate because it does not take into account the effect of permeation on the measurements made by the system.

The primary containment vessels and liners of underground storage tanks and associated devices are fabricated of materials which are more-or-less permeable to the substances stored in them. Even a modest permeation of one ounce of hazardous substance per 24 hours per square foot of containment vessel surface can result in the tank-liner interspace being filled with the hazardous substance at a significant rate. Consequently, a small leak of the magnitude which is required to be detected by current EPA standards may be masked by a changing interspace pressure attributable to the permeation and will remain undetected. And, in many cases, this problem of permeation masking leaks is complicated by the combination of outward permeation of a contained substance into a tank/liner interspace and by permeation of ground water and/or other substances inwardly to that space. This significantly lessens the probability that, in the heretofore proposed systems, the conditions in the tank/liner interspace will have the constancy needed so that changes in that space indicative of a small leak can be detected.

There are a number of leak detection techniques other than those reported in the above-cited patents and non-patent documents.

The use of double wall piping with leak detection tracers in the annular space between the inner and outer walls has been, and is, fairly widely used in the chemical industry where losses due to leaks are possibly both expensive and dangerous.

Volumetric leak detection systems, also, have been available for many years. The most familiar volumetric leak detection method is the gauge stick used at service stations. In this approach, the operator, by reconciliation of tank volume readings with tank inputs and outputs, attempts to discover if the tank or ancillary equipment (pipes, pumps, or dispensers) is losing fuel to the surrounding environment. The use of this system, mechanized if not electronically calculated, is the basis for an entire industry attempting to discover and verify leaks or their absence. Under the EPA rules for underground storage systems, such a system is accepted under certain conditions. However, all such systems rely upon a conversion of height to volume, the factoring in of temperature gradients, surrounding environmental changes, and so on. The control of so many variables has made the development of accurate and reliable volumetric systems very difficult and has led to EPA regulations banning the use of such systems in a stand alone mode for leak detection.

SUMMARY OF THE INVENTION

There have now been invented, and disclosed herein, certain new and novel leak detecting and monitoring systems for containment vessels. These systems are accurate to a degree well exceeding current EPA standards. They are adaptable to both underground and aboveground systems and to the monitoring of pipes and other devices as well as tanks. Also, they can be employed in: (1) storage systems having a traditional steel, concrete, or other primary containment encapsulated in an envelope or secondary containment, and (2) those more recently developed storage systems which employ an inner liner as the primary containment and the more traditional vessel as the outer, secondary containment. And, the herein disclosed containment monitoring and leak detection systems can be used with storage systems having both a secondary containment for fluids leaked from the primary containment and an outer liner which keeps fluids in the surrounding environs from leaking into the primary containment vessel.

The novel leak detection systems of the present invention have a high vacuum side which is used to check containment vessel envelopes and liners) for leaks before the storage system is put into use, when it is refurbished with a new envelope or inner liner, and periodically while the storage system vessel is in use.

Also, the high vacuum system is used to withdraw from the space between the primary and secondary containments contained substance released into that space from the primary containment vessel. Operation of the high vacuum system to this end for periods of greater frequency and/or longer duration than would be predicted absent a release by leakage is an indication that a leak has occurred. And, the same information can be employed as a measure of the magnitude of an otherwise detected leak. Alternatively, or in addition, evacuated volumes can be measured and volumes greater than predicted utilized as leak indicators. Also, the evacuated liquid can be sampled and analyzed to shed further light on the problem or potential problem.

The low vacuum side of the leak detection system is employed to maintain in the space between the primary and secondary containments a negative pressure that is high enough to keep the two containments in firm contact. This keeps that small volume space constant and makes the detection of very small leaks without the generation of false readings possible. That is, a very small leak may be impractical, if possible at all, to detect when measured against the orders of magnitude larger volume in a containment vessel. However, that same leak will result in the volume of contained substance in the very small volume interstitial space between a containment vessel and an encapsulating envelope or inner liner and the pressure on the substance released to that space from the primary containment being increased to the extent that the changes are readily detectable.

As explained above, unpredicted changes in the volume of contained substance released to the interstitial space can be employed as an advisory of a possible leak. A possible leak can also be indicated if the low vacuum side of the leak detection system operates oftener and/or for periods of greater duration than are predicted to be necessary to maintain primary and secondary containment vessel contact. It bears repeating, in this regard, that the volume of the interstitial space is very small, that very small leaks into that space will therefore significantly increase the pressure in the space, and that such pressure changes are readily detectable by the approach just discussed.

Both of the above-described approaches to identifying possible leaks are also extremely accurate; i.e., the possibility of a false indication of a leak is very low. This is because, as is not the case in other leak detection systems, permeation of the contained fluid through the wall of the primary containment into the interstitial space is taken into account in projecting the volume of fluid that will over a period of time collect in the interstitial space in the absence of a leak and increase the pressure in that space. Thus, it is trends against which the actual volumes of collected substance and pressure in the interstitial space are measured, and these trends accurately reflect what is expected to take place in the interstitial space over time.

Aside from improving accuracy (i.e., reducing the incidence of false alarms) and reducing the size of the leak which will trigger a response, the novel containment vessel monitoring and leak detection systems disclosed herein have the advantage that they are simpler and less expensive t construct and operate than the typical, heretofore proposed system. The latter operates on a large interspace volume between a containment vessel and its liner Consequently, a high capacity, complicated, receiver-type system is required to maintain an adequate vacuum in the containment vessel/liner interspace. The cost of providing the receiver system and its attendant problems are avoided and the increased cost of operating a receiver-type system eliminated by the novel, controlled interstitial volume approach disclosed herein. The high vacuum side of the leak detection system will typically not require a receiver at all, and a simple system with a small receiver will suffice to keep the pump of the low vacuum side from running continuously.

Furthermore, a small leak may cause only a slight change in the conditions existent in a large containment vessel/liner interspace. Thus, small, but significant, leaks may remain undetected for a considerable period of time if the prior art approach to the detection of leaks is employed, assuming that such leaks are detected at all.

Also, because a small leak to the surrounding environs will markedly change the pressure in the controlled volume interstitial space, the low vacuum pump of a leak detection system employing the principles of the present invention will start up at unpredicted times or operate for longer periods than expected if even a pinhole leak occurs in a liner encapsulating a primary containment vessel. Thus, violations in the integrity of the liner and the consequent potential for leakage of a substance from that component into the surrounding environs are readily identified.

As suggested above, I have also invented containment systems in which the primary containment vessel is enveloped in a set of two overlying liners. One of these liners surrounds the rigid containment vessel of the storage system. The second liner may be sandwiched between the just-mentioned outer liner and the rigid vessel and thus serve as the secondary containment. Or, it may be located inside the rigid vessel and thus serve as the primary containment.

Irrespective of their particular relationship to the rigid vessel, the two liners cooperate with the rigid containment vessel to confine substances leaking out of the primary containment vessel and to keep substances in the surrounding environment from leaking into the interstitial space between the primary and secondary containments. That keeps inwardly leaking substances from mixing with substances released to the interstitial space by leakage or permeation from the primary containment vessel. The present invention can be employed to advantage in detecting leaks, whether from the primary containment vessel or the surrounding environs, in such dual liner storage systems.

OBJECTS OF THE INVENTION

From the foregoing, it will be apparent to the reader that one important and primary object of the present invention is the provision of novel, improved systems for monitoring and detecting leaks in fluid storage and handling systems having such diverse primary containment vessels as tanks, inner liners, pipes, fittings, flanges, valves, and pumps.

Other related, and also important, but more specific objects of the invention are the provision of monitoring and leak detection systems as characterized in the preceding paragraph:

which can be used to advantage with both underground and aboveground systems;

which are capable of detecting leaks of the very small volume mandated by EPA and other standards and by economic considerations;

which equal or exceed standards limiting the probability of a false reading of a leak being made;

which can be employed to detect and monitor leakage into a system from the surrounding environs as well as leakage outwardly from the primary containment vessel;

which are relatively economical to provide and operate and have a long service life, especially in regard to those components which are not readily accessible; and which are of a universal character in that they can be employed to detect the leakage of virtually any fluid from a primary containment into the space between that containment and a secondary containment.

Other important objects and features and additional advantages of the present invention will be apparent to the reader from the foregoing and the appended claims and as the ensuing detailed description and discussion proceeds in conjunction with the accompanying drawing.

BRIEF DESCRIPTION OF THE DRAWING

In the drawing:

FIG. 6 is a fragmentary view of a third storage system with monitoring and leak detecting capabilities in accord with the principles of the present invention; this storage system differs from the embodiment shown in FIG. 1 principally in that the primary containment vessel is constituted by a liner in a tank, line, or the like;

DETAILED DESCRIPTION OF THE INVENTION

Figures 1, 2:
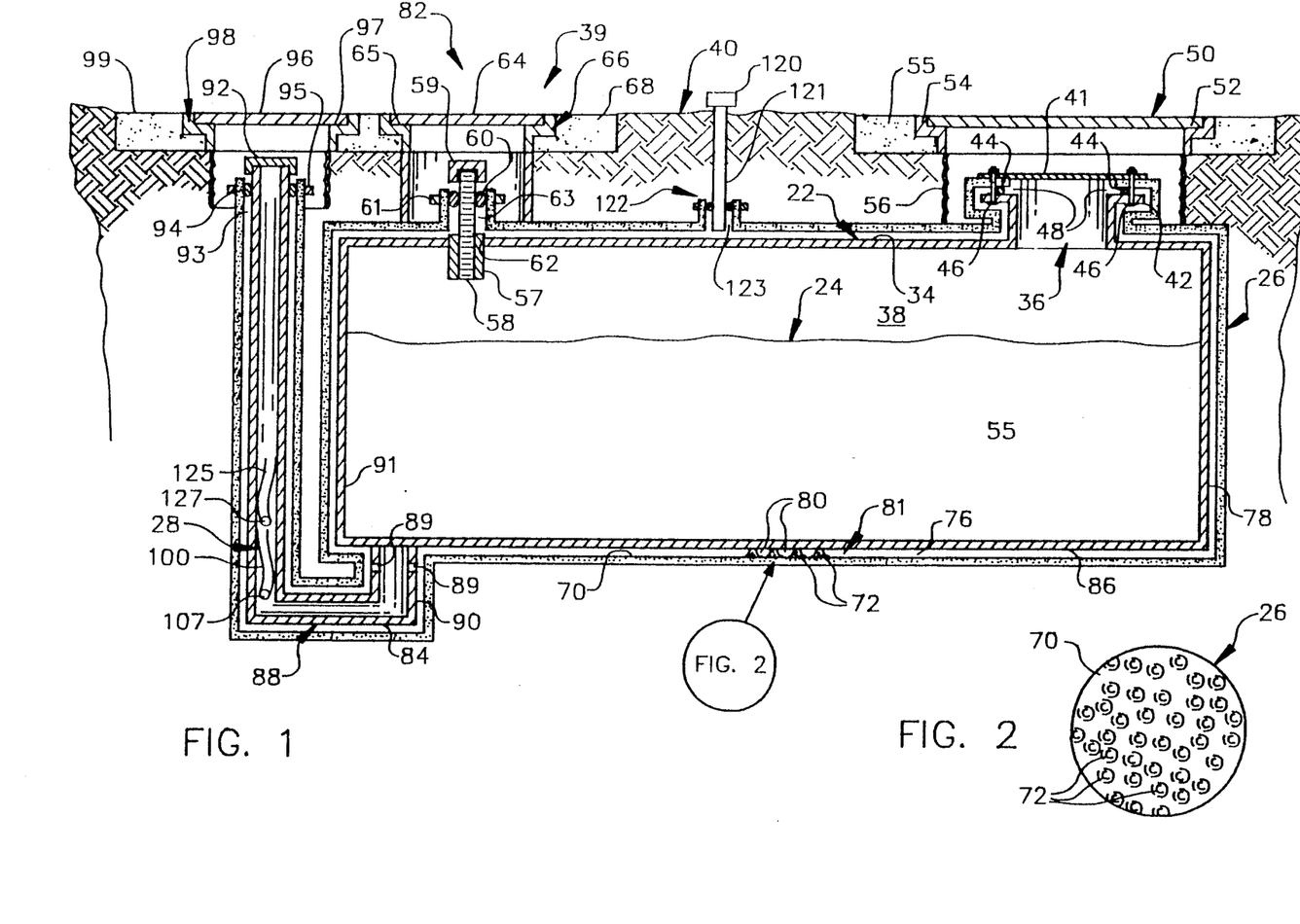
FIG. 1 is a longitudinal section through an exemplary storage or containment system for environmental contaminants (and other substances) and the physically associated components of a system for monitoring the primary containment vessel of the system and for detecting leakage of the contained substance from that vessel.
FIG. 2 is a fragmentary plan view of an embossed, encapsulating geomembrane employed in the containment system of FIG. 1 to prevent escape from the system of contained substance released from the primary containment vessel.

Referring now to the drawing, FIG. 1 depicts a tank-type, primary containment vessel 22 for a contained substance 24. Containment vessel 22 is encapsulated in an envelope 26, which functions as a secondary containment. That envelope keeps contained substance released from tank 22 from escaping into the surrounding environment—soil, water, air, etc.

Also depicted in FIG. 1 are the tank-associated components of a system 28 which is constructed in accord with the principles of the present invention and is employed to monitor containment vessel or tank 22 and produce advisories warning of possible leaks in that tank. System 28, which has a high vacuum side 30 and a low vacuum side 32, can also be employed to measure the magnitude of any leaks that may occur and to test envelope 26 for leaks in that component.

Tank 22 is, by itself, not the present invention. Its details will accordingly be described herein only to the extent necessary for an understanding of the present invention. Briefly, it is a vessel, typically fabricated of mild steel or concrete, which is designed to be buried underground and to hold a contaminant such as gasoline or other petroleum product. Communicating with the upper side 34 of tank 22 are a standard manhole 36, which furnishes physical access to the interior 38 of tank 22, and a vent/fill system 39. Both are accessible from the surface 40 of the soil or other medium in which tank 22 is buried.

Vent/fill system 39 is employed to fill primary containment vessel 22. It is also used for visual access to the interior of vessel 22 and its contents and for dipstick verification of the amount of contained substance 24 in vessel 22.

A conventional cover 41 is bolted or otherwise secured to a radial flange 42 at the upper end of the manhole 36. An O-ring or similar seal 44 is disposed between flange 42 and manhole cover 41 inside of the locus of the cover-securing bolts 46 to keep contained fluid 24 from escaping through the manhole-to-cover gap 48. Bolts 46 extend through envelope 26. Caulking (not shown) around these bolts keeps the contained substance from leaking through the holes in the envelope and isolates the space between the primary and secondary containments 22 and 26 from the surrounding environment.

Manhole 36 is accessed from surface 41 by first removing a second, grade level cover 50. This cover is supported on the ledge 52 of a cylindrical fitting 54, typically set in a concrete pad 55. A corrugated tube 56 keeps dirt from falling onto the lower manhole cover 41.

Vent/fill system 39 includes an internally threaded fitting 57, an externally threaded pipe 58, a cap 59, a seal 60, and a compression ring 61.

Fitting 57 extends into primary containment vessel 22 through an aperture 62 in the upper side 34 of the vessel. It is secured in place and sealed to the primary vessel as by welding.

Pipe 58 is threaded into fitting 57 and thereby communicates with the interior of primary containment vessel 22. Cap 59 is removably screwed onto the upper end of the pipe to keep foreign substances from the interior of primary containment vessel 22 during those periods when access to the interior of the containment vessel through pipe 58 is not required.

Seal 60 surrounds pipe 58 and seals the gap 63 between it and secondary containment 26. Compression ring 61 clamps the secondary containment or envelope, seal 60, and pipe 58 together to ensure that nothing leaks through gap 63.

Access to vent/fill system 39 is gained by removing a gradeline cover 64 at the surface 40 of the ground in which vessel 22 is buried. This cover is seated on the horizontal ledge 65 of a vertically oriented, cylindrical fitting 66, in this case set in a concrete pad 68.

The envelope 26 referred to briefly above is a geomembrane which may be reinforced or unreinforced. It is typically fabricated from a polyvinyl chloride or perhaps a polyurethane. Geomembrane 26 completely surrounds tank 22 and is so assembled to the ancillary, vessel-associated hardware such as the manhole 36 and vent/fill system 39 and tank-associated, leak detection system components in the manner discussed above and hereinafter as to keep contained substance 24 released from tank 22 from escaping into the surrounding environment and to provide isolation of the containment interspace.

As is shown in FIG. 1, and in more detail in FIG. 2, the inner side 70 of the geomembrane is embossed, providing nubs 72 or other raised elements (see also FIG. 2). Nubs 72 space the inner surface 70 of the tank bounding part 76 of geomembrane 26 away from the outer surfaces of tank 22 (collectively identified in FIG. 1 by reference character 78). This provides a host of communicating interstices 80 between tank 22 and geomembrane 26. The communication among interstices 80 allows for free migration of contained substance 24 released to the interstitial space 81 constituted by the interstices. Such communication also promotes the wanted collection of that substance in a catchment 84 which is located beneath the lower side 86 of primary containment vessel 22 and is the lowermost, horizontal leg of a standpipe 88. The volume of catchment or sump 84 will typically be a small multiple (1, 2, or 3) of the volume in the interstitial space 81 between containment vessel 22 and geomembrane 26.

Standpipe 88 communicates with the interstitial space 81 between tank 22 and geomembrane 26 via perforations 89 in its tank-associated, vertical section 90. From tank 22, standpipe 88 extends downwardly, horizontally past the left-hand end 91 of the tank, and then upwardly toward the surface 40 of the medium in which encapsulated containment vessel 22 is buried.

The just-described catchment arrangement is preferred so that the contained substance released from containment vessel 22 into the interstitial space between it and geomembrane 26 will not accumulate in the interstitial space itself. That would increase the unwanted probability of the released, contained substance being entrapped and escaping withdrawal and analysis. Also, contained substance trapped in the interstitial space might act as a restraint against permeation and leakage, thereby increasing the probability that a leak might remain undetected.

The upper end of standpipe 88 is closed with a cap 92. The gap 93 between the standpipe 88 and geomembrane or envelope 26 is sealed by an annular seal 94 between the standpipe and geomembrane and a compression ring 95 surrounding the membrane.

Access to the standpipe is gained by removing a grade level cover 96. The cover is seated on the horizontal ledge 97 of a cylindrical fitting 98 set in a concrete pad 99.

Referring still to the drawing, it will be remembered that a system 28 for monitoring tank 22 and providing advisories warning of possible leaks is associated with the primary containment 22 and secondary containment 26 to monitor the primary containment and detect the release of contained substance into interstitial space 81 by leakage.

It will also be remembered that system 28 has a high vacuum side 30 and a low vacuum side 32. These sides or subsystems are respectively illustrated in FIGS. 3 and 4.

Figure 3:
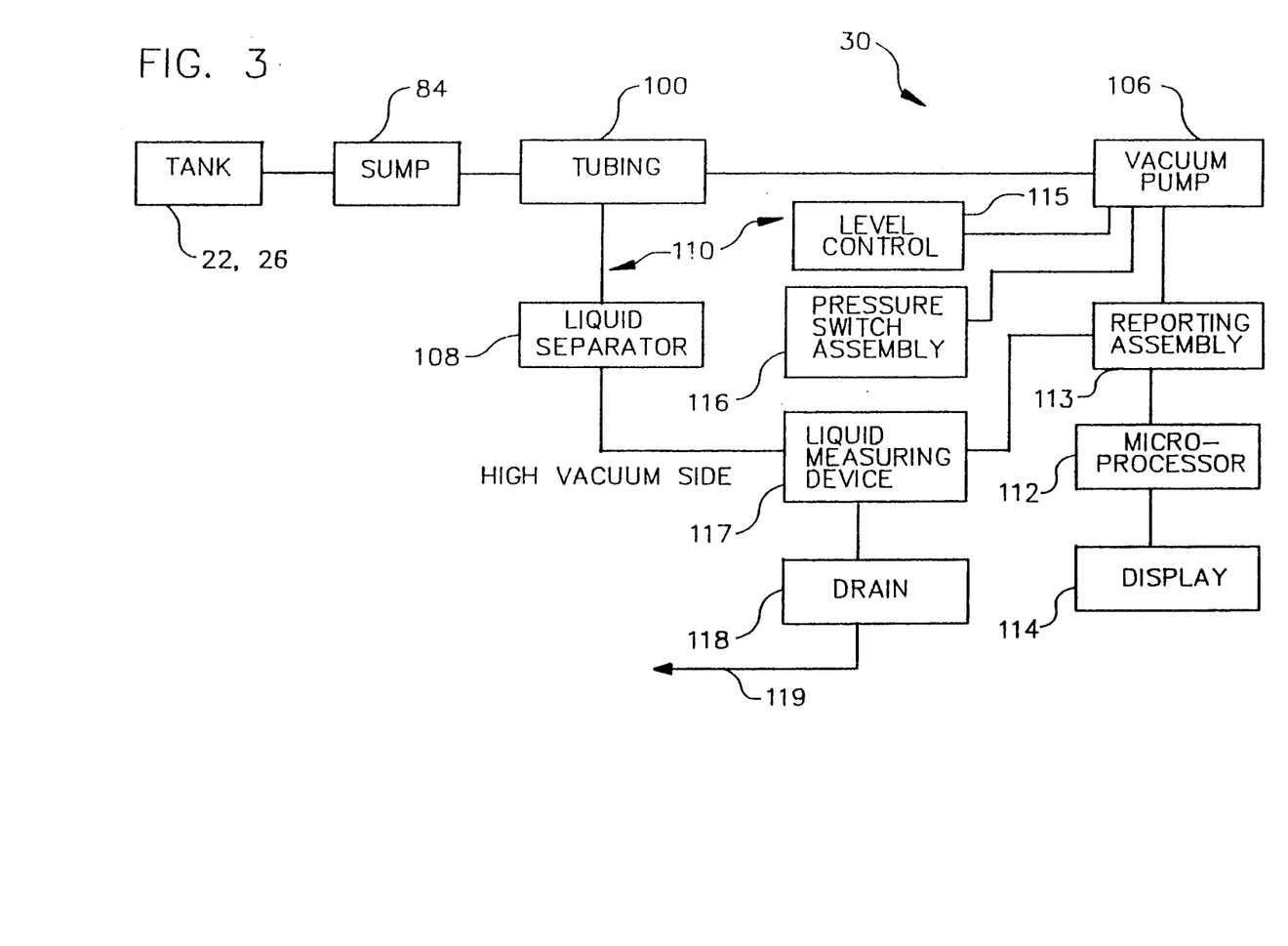
FIG. 3 is a block diagram of a low vacuum subsystem incorporated in the containment vessel monitoring and leak detection system.

Referring first to FIG. 3, the high vacuum side 30 of system 28 is employed to verify the integrity of geomembrane 26 before containment 22 is put into operation or after refurbishing or periodically while the containment is in use. It is also employed to evacuate contained substance 24 released from tank 22 into the interstitial space 81 between the tank and encapsulating geomembrane 26 and trapped by the geomembrane. Evacuation of contained substance 24 from interstitial space 81 can be used directly to warn of possible leaks. Alternatively, the collected substance may simply be withdrawn in a manner which allows low vacuum subsystem 32 to fullfil the leak-detecting role.

Included in high vacuum subsystem 30 are a high side vacuum line 100 which provides fluid communication between standpipe 88 of and a vacuum pump 106. Controlled substance 24 released from tank 22 into interstitial space 81 will first drain into, and collect in, the lowermost, horizontal leg or catchment 84 of standpipe 88. Vacuum pump 106 evacuates the collected, contained substance from interstitial space 81 by way of standpipe 88. To this end, the lower, inlet end 107 of vacuum line 100 is located at, and communicates with, the lowermost standpipe leg 84.

It is of course not necessary that a vacuum system be employed for the purposes just described. In an aboveground system, for example, this could be accomplished simply by way of a drain (not shown) on the lower side of catchment 84.

If the illustrated, exemplary system 30 is employed, however, a conventional liquid separator 108 is inserted on the upstream side of the pump 106 so that liquids can be removed from the vacuum system 110 of leak detection subsystem 30 without destroying the vacuum.

As mentioned above, one important use to which the just-described vacuum system 110 is put is integrity testing. To that end, vacuum pump 106 is employed to evacuate interstitial space 81 to a relatively high negative pressure, preferably in the range of 5–10 psi instead of the much lower 1 psi heretofore employed in integrity testing. By employing this higher pressure differential, even pinhole leaks can be readily detected.

As discussed above, vacuum system 110 can also be employed to detect leaks from tank 22 into interstitial space 81 with a high degree of sensitivity. Furthermore, the detection of leaks is accurate; i.e., the probability of a false indication being made is extremely small.

In this regard, monitoring and leak detection systems heretofore do not take into account the permeability of the vessel holding the contained material. Sensitivity is thereby lost and the possibility of a false warning significantly increased. Significant amounts of a contained substance can be released from the vessel holding that substance. For example, gasoline permeates to a considerable extent through the walls of the underground storage tanks in which that fuel is typically stored.

Also, as discussed above, many heretofore proposed leak detection systems employ the volume in the containment vessel itself as the base against which a leak is measured. These systems are not accurate because the leak-to-volume ratio is so small that minor, but significant, leaks are apt to remain undetected.

All of these failings are remedied by leak detection system 28. In particular, the interstitial space 81 between tank 22 and geomembrane 26 made up of interstices 80 is very small compared to the internal volume of the tank. Consequently, even a very small or slow leak will result in the volume of the contained substance collected in the interstitial space being increased to such an extent that the volume change can be readily detected. It is this change which is employed by system 30, not the change in the volume of contained substance in primary containment vessel 22.

In accord with the principles of the present invention, permeation is taken into account by predicting the rate at which contained substance 24 would be expected to be released from tank 22 and collect in interstitial space 81 by this phenomenon and in liquid form, in the vapor phase, or as a vapor/air mixture. The calculations are straightforward; they take into account: (a) the compatibility of the contained substance and the material it contacts; (b) the permeability of the material from which tank 22 is fabricated for the particular substance 24 held in the tank; (c) the wall thickness of the tank; (d) the area of the internal tank surfaces; (e) time; (f) the level to which the primary containment is filled; and (g)the fact that permeability is usually initially higher, then decreases and stabilizes. This information is employed to generate a predicted or projected trend in the release of contained substance from tank 22. Data representing the trend is stored in memory in a microprocessor 112.

Data is inputted to microprocessor 112 from vacuum pump 106 by way of a reporting assembly 113 which converts the data to a form that microprocessor 112 can use.

In integrity testing, vacuum pump 106 is employed to create a high vacuum in the 5–10 psi range discussed above in interstitial space 81 and then turned off. Even a pinhole leak in geomembrane 26 will result in the pressure in the interstitial space increasing at a rate which can be readily identified as leak related. The leak identifying information is generated and processed by reporting assembly 113 which inputs that information in an appropriate form to microprocessor 112. Thereupon, the latter causes an appropriate message to appear at display 114. That leak detection system component may be a monitor, graphic plotter, printer, other peripheral device or a combination of peripheral devices.

In tank monitoring and leak detection, a leak is considered to have possibly occurred if contained substance 24 is released from tank 22 to interstitial space 81 at a rate exceeding that predicted to have occurred by permeation of the substance through the walls of containment vessel 22. It is furthermore taken as evidence of this that vacuum pump 106 operates oftener, and/or for longer periods, than would be expected from the trend information stored in microprocessor 112. Consequently, by monitoring the operation of vacuum pump 106 with reporting assembly 113 under the control of microprocessor 112, abnormal operation of vacuum pump 106 can be readily identified by microprocessor 112 and a warning of a possible leak displayed if vacuum pump 106 does operate abnormally.

High side vacuum pump 106 may be turned on and off in any appropriate manner—for example, by a high limit, low limit level control 115 when it is used for leak detection and by a pressure switch 116 when it is employed for verification of liner integrity.

Alternatively, or in addition to the approach just described, the amount of contained substance actually evacuated from catchment 84 and/or interstitial space 81 can he directly measured by a metering, optical, or other type of measuring device 117 or manually as with a sight glass. The volume data is inputted to reporting assembly 113. Thereafter, subsystem 30 functions in the manner just described. That is, if the amount of contained substance 24 actually evacuated exceeds the amount predicted to be released to the interstitial space, microprocessor 112 will cause a message warning of a possible leak to appear at display 114.

Liquid measuring device 117 and/or liquid separator 108 are preferably provided with a drain 118. This provides for sampling of the substance actually released into interstitial space 81. This is important. By identifying the evacuate, it can be determined whether it is from a leak in the containment vessel or other source—for example, the evacuate might contain ground water, thereby indicating the presence of a leak in encapsulating geomembrane 26.

A line 119 is connected to drain 118. This line is used to return evacuated, contained substance to tank 22 or to dispose of that substance in an appropriate manner, thereby readying high side vacuum subsystem 30 for a subsequent cycle of operation.

Measuring device 117 also allows one to quantify a detected leak. The difference between: (a) the volume of the contained substance 24 actually evacuated from catchment 84 or interstitial space 81, and (b) the volume projected to be released to the interstitial space in the absence of a leak is indicative of the size or magnitude of the leak.

Referring again to FIG. 1, a pressure equalizing valve 120 provides fluid communication between the atmospheric pressure, surrounding environs and interstitial space 81 when high side vacuum system 110 is in operation. This valve opens as necessary to admit air to interstitial space 81 and keep the differential between atmospheric and interstitial space pressures from exceeding a selected magnitude. Thus, excess pressure differentials that might overload the vacuum pump or overstress or rupture the encapsulating envelope 26 are avoided.

Valve 120 communicates with interstitial space 81 via a perforated pipe 121 fixed to the upper side 34 of primary containment vessel 22. A seal/compression ring set 122 like those described above in conjunction with vent/fill assembly 39 and standpipe 88 keeps substance released to interstitial space 81 from escaping through the gap 123 between perforated pipe 121 and the secondary containment or envelope 26.

Figure 4:
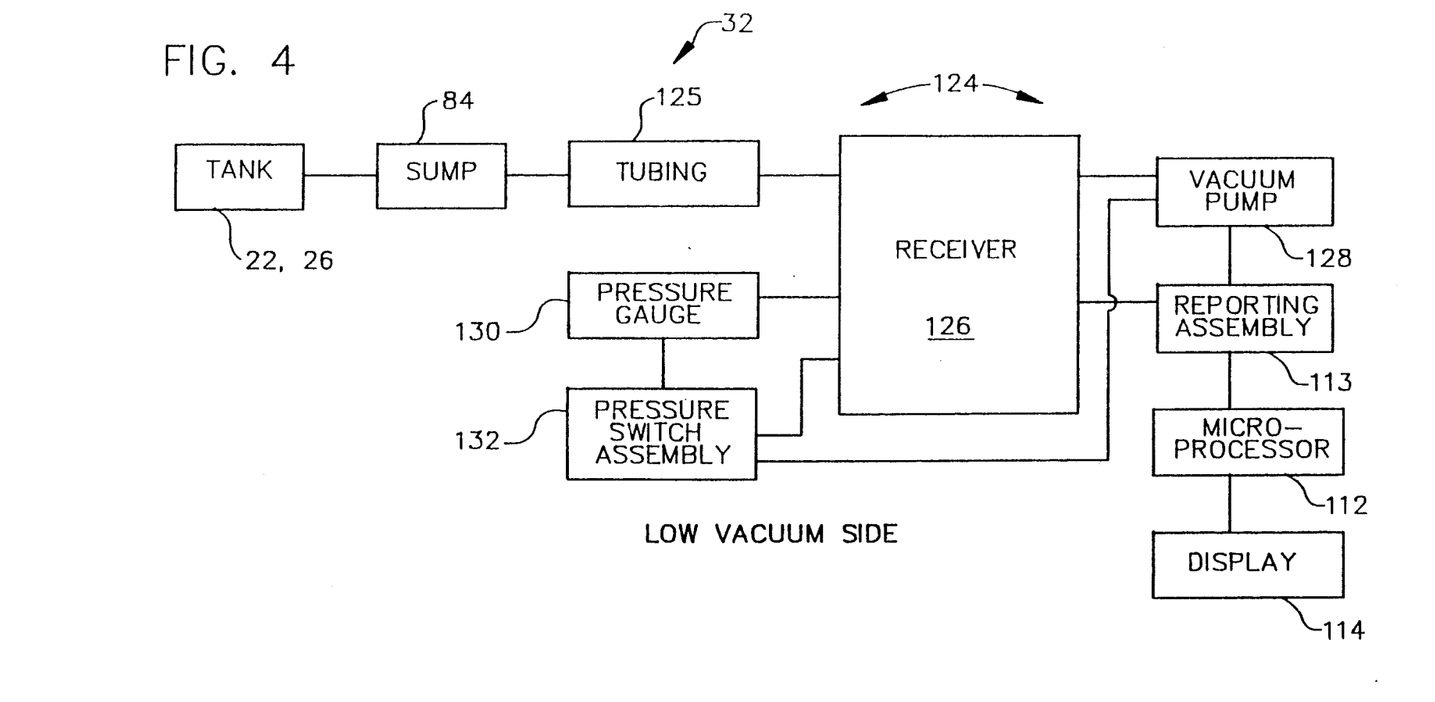
FIG. 4 is a block diagram of a high vacuum subsystem incorporated in the containment vessel monitoring and leak detection system.

Referring now to FIG. 4, the low vacuum side or subsystem 32 of monitoring and leak detection system 28 is also multifunctional. One important function of subsystem 32 is to maintain in interstitial space 81 a negative pressure, typically in the range of 0.4 to 0.6 psi. This is high enough that the differential pressure across geomembrane 26 will hold the geomembrane in firm contact with containment vessel 22. That keeps the volume of the interstitial spaces 81 between the geomembrane and tank 22 constant and contributes markedly to the accuracy with which leaks can be detected. Higher negative pressures than needed to hold geomembrane 26 against primary containment vessel 22 are generally undesirable. High negative pressures may result in contained substance being forced out of sump or catchment 84. That is undesirable because it adversely affects the accuracy of the measurements made by the high vacuum side 30 of leak detection system 28.

Also, subsystem 32 can be employed in place of, or in addition to, the high vacuum side 30 of system 28 to warn of possible leaks in tank 22.

Common to both the low and high sides 30 and 32 of leak detection system 28 are reporting assembly 113, microprocessor 112, and display 114. These components have been duplicated in FIG. 4 to facilitate an understanding of the subsystem 32 illustrated in that figure.

In addition to the components referred to in the preceding paragraph, the low vacuum side of leak detection system 32 includes a vacuum system 124 with a vacuum line 125 (see also FIG. 1). Vacuum line 125 provides communication between a receiver 126 in vacuum system 124 and the interstitial space 81 between tank 22 and geomembrane 26. The lower, inlet end 127 of vacuum line 125 is located in standpipe 88; and fluid communication between the standpipe and interstitial space is provided by the perforations 89 in the standpipe wall.

The receiver 126 in the vacuum system 124 of low vacuum side 32 is employed for conventional purposes; viz., to provide a vacuum reservoir and thereby significantly decrease the amount of time for which the vacuum pump 128 of system 124 is required to operate to maintain the required level of negative pressure in interstitial space 81.

What are shown in FIGS. 3 and 4 as a separate high side vacuum pump 106 and low side vacuum pump 128 can be replaced with a single pump. In this case, check valves (not shown) are employed to isolate the high and low side vacuum systems 110 and 124 and thereby keep the low side vacuum system from being damaged while the high side vacuum system is in operation.

Other major components of low side vacuum system 124 are a pressure gauge 130 and a pressure switch assembly 132.

Pressure gauge 130 is employed to verify that the negative pressure in interstitial space 81 is at, or above, the minimum level needed to hold geomembrane 26 against containment vessel 22.

Increases of the interstitial space pressure above the minimum level will be detected by pressure switch assembly 132. This will result in vacuum pump 128 being turned on and operating until the pressure in the interstitial space is again reduced to at least the minimum operating level.

A release of gasoline or light distillate from a 10,000 gallon tank by permeation might run two pints over a four to five week period. Vacuum pump 128 might run once every eight to ten days to restore the vacuum lost by that permeation.

Like the other monitoring schemes disclosed herein, that employing low vacuum side 32 involves a comparison of actual data with trend data and employs differences between the actual and predicted data as evidence of possible leaks.

In employing the subsystem 32 of leak detection system 28 illustrated in FIG. 4 for leak detection, trend information constituting a projection or prediction of the frequency and/or operating duration of vacuum pump 128 needed to maintain the negative pressure in the interstitial space at the operating level absent a leak is stored in microprocessor 112. Taken into account in this stored, trend data is the non-leak-related effect of release into the interstitial space of contained substance 24 by permeation. Also taken into account is the non-leak-related effect of operating the vacuum pump 106 in the high vacuum side 30 of system 28 to evacuate sump 84, to test the integrity of encapsulating geomembrane 26, etc.

In employing vacuum system 124 for leak detection, it is the frequency of operation of vacuum pump 128 and/or the durations of the periods for which that pump operates that is compared with the stored trend data. If the vacuum pump operates more frequently, or for longer periods than is projected, as determined by microprocessor 112 in its comparison mode, the microprocessor will output to display 114 a message warning of a possible leak in tank 22.

A typical installation involving leak detection in accord with the principles of the present invention might involve a 10,000 gallon underground storage tank for petroleum products. The probability that a leak detection system as discussed above and illustrated in the drawing would detect a leak of 0.1 gallon per hour or higher is in the range of 0.95–0.99, and the probability of a false alarm being generated is 0.01 or lower.

In conjunction with the foregoing, it is pointed out above that a microprocessor-based comparison of trends and actual measurements is not essential in identifying leaks by the precepts of the present invention or in identifying the sizes of those leaks although microprocessor-based systems do tend to decrease the time required to identify a leak and to increase the probability that leaks—even very small ones—will be detected. Instead, as one example, manual sight glass or dipstick measurements can instead be used with the understanding that the reliability of such measurements may be questionable.

In leak detection system 28, there is a one-to-one correspondence between the number of containments serviced by such leak detection system components as reporting assembly 113, liquid measuring device 117, microprocessor 112, and display 114. However, it will be understood by those versed in the relevant arts that this relationship is not essential and that, by providing appropriate lines and valving, a single set of the foregoing components can be employed to monitor multiple containment systems.

Figure 5:
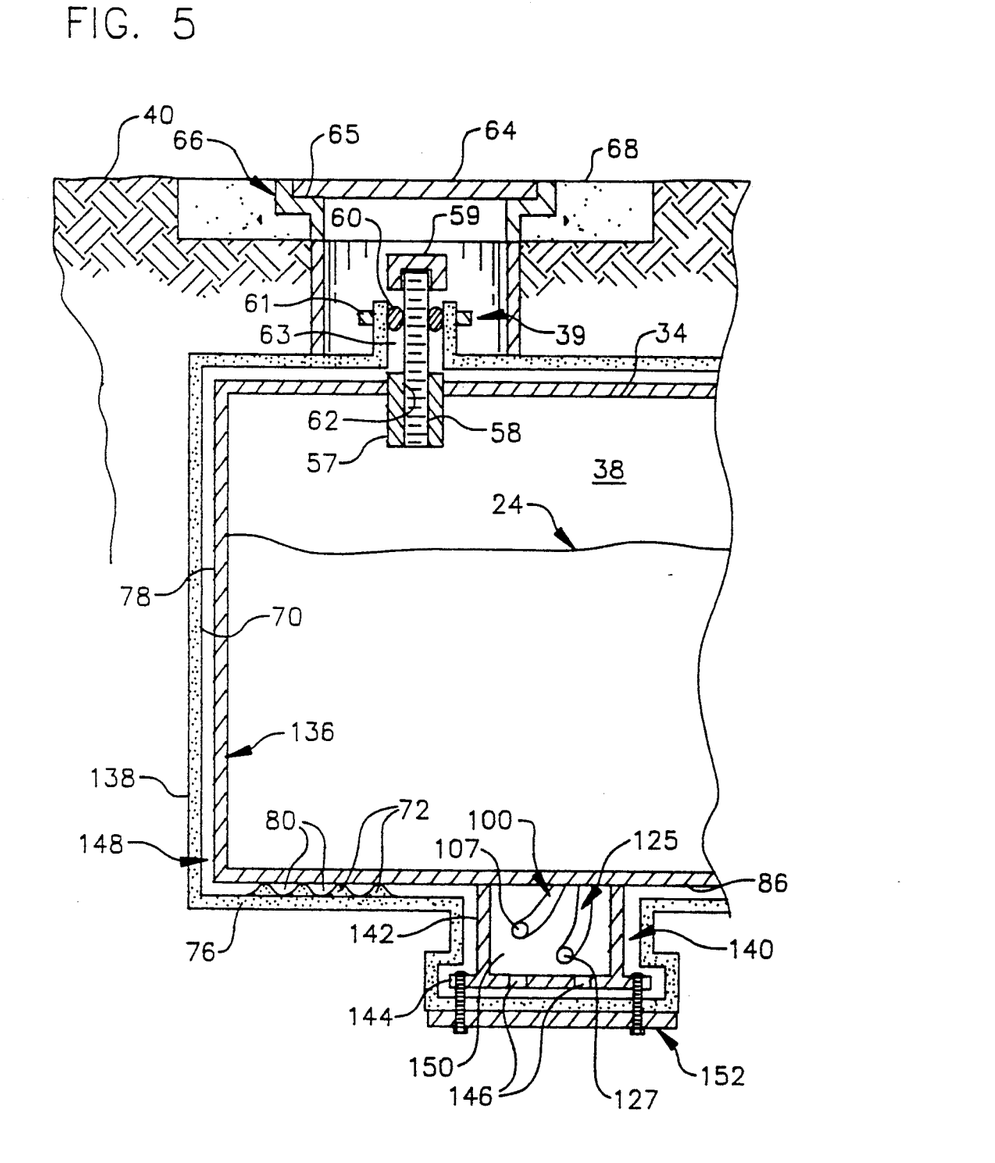
FIG. 5 is a fragmentary section through a second type of storage system with a containment monitoring and leak detecting system which embodies the principles of the present invention and differs from the embodiment shown in FIG. 1 primarily in that it has a different type of catchment for collecting contained substance released from the system's primary containment vessel.

Referring again to the drawing, FIG. 5 depicts a tank-type, primary containment vessel 136 with a leak detection system like the one discussed above, illustrated in FIGS. 1–4, and identified by reference character 28. Tank 136 is encapsulated in an outer or external envelope (or secondary containment) 138 like tank 22 is, but differs from the latter in that the standpipe-type catchment 88 of tank 22 has been replaced with a sump-type catchment 140.

To the extent that tanks 22 and 136 and ancillary components and systems are alike, they will be identified by the same reference characters; and only the differences will be described in detail herein.

Referring again to FIG. 5, the sump-type catchment 140 which differentiates the installation shown in FIG. 5 from that depicted in FIG. 1 has a cylindrical side wall 142 and an integral, platelike bottom wall 144. Perforations 146 in bottom wall 144 of sump 140 allow substance released to the interstitial space 148 between primary containment vessel 136 and envelope or secondary containment vessel 138 to flow into, and collect in, the interior 150 of sump 140.

A plate 152 bolted to the bottom wall 144 of sump 140 lies below, and protects, that part of secondary containment 138 beneath sump 140.

Encapsulated, primary containment vessel 136 is provided with sump 140 so that it can be monitored and the release of contained substance into interstitial space 148 by leakage detected with a monitoring and leak detection system of the character discussed above and identified by reference character 28. In this case, the lower, inlet end 107 of high side vacuum line 100 and the lower, inlet end 127 of low side vacuum line 125 extend into the interior 150 of sump 140. As discussed above, this space communicates with interstitial space 148 through the perforations 146 in sump bottom wall 144.

Figure 6:
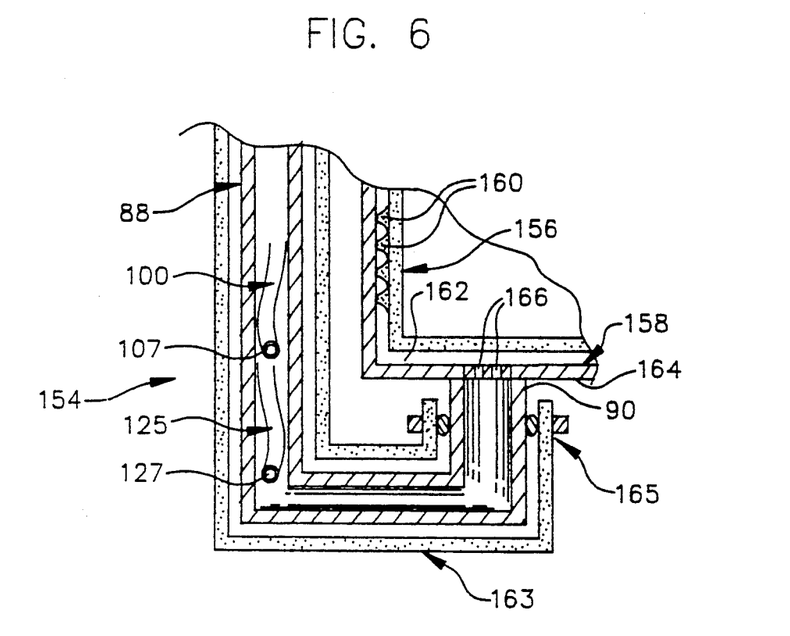

Referring still to the drawing, FIG. 6 depicts yet another containment or storage installation 154. Installation 154 differs from those shown in FIGS. 1 and 5 primarily in that, instead of a tank-type primary containment vessel in an encapsulating envelope, it has an inner liner 156. That liner serves as the primary containment, and a rigid, tank-type vessel 158 in which the liner is disposed functions as the secondary containment.

Nubbins 160 on inner liner 156, or the equivalent, provide between that liner and tank 158 an interstitial space 162 of the character discussed above.

In installation 154, leak detection system 28—represented in FIG. 6 by the lower, inlet end 107 of its high side vacuum line 100 and the lower, inlet end 127 of its low side vacuum line 125—monitor inner liner 156 and detect the release of contained substance through that liner into interstitial space 162 by way of leaks in the inner liner. This is done in the same ways that are used when the storage system is as illustrated in FIG. 1.

In installation 154, a separate geomembrane 163 surrounds standpipe 88 and functions as a secondary containment for contained substance released through the standpipe. This secondary containment 163 is sealed to the upper end of the standpipe by seal 94 and compression ring 95 and to the vertical standpipe section 90 at the lower side 164 of secondary containment vessel 158 by a comparable seal/compression ring set 165. Perforations 166 in the lower side 164 of vessel 158 provide fluid communication between interstitial space 162 and standpipe 88.

In many instances, there is a dual concern—leakage of a contained substance from a primary containment vessel and leakage into an installation from the surrounding environs. For example, in a buried installation, ground water, itself perhaps contaminated, might leak through a secondary containment member into a space between that member and a primary containment and there mix with a contained substance leaked into the same space. Such a phenomenon would be of concern because, for example, of the possibility that contained substance released into the space between the primary and secondary containments might become contaminated and inadvertently recycled.

Figure 7:
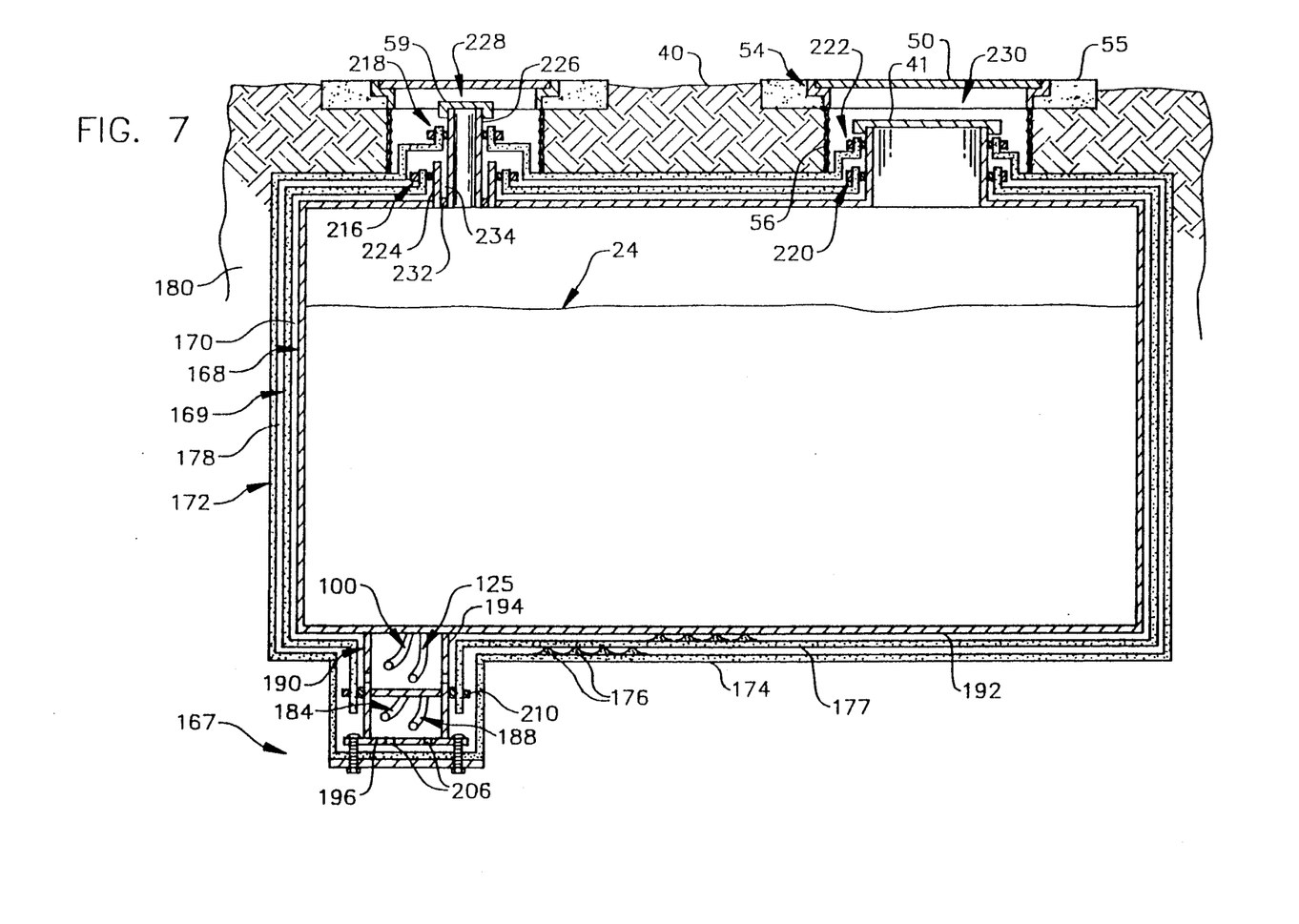
FIG. 7 is a view, similar to FIG. 1, of a fourth system with containment monitoring and leak detection capabilities which embody the principles of the present invention and are capable of detecting both leaks from a primary containment vessel and leaks into the storage system from the surrounding environs.

Referring again to the drawing, FIG. 7 depicts an installation 167 so designed that both leakage from the surrounding environs and leakage of contained substance from a primary containment vessel can be identified and measured. Installation 167 is like the installations shown in FIGS. 1 and 5 to the extent that it includes a tanklike primary containment 168 encapsulated in an envelope-type secondary containment 169 with an interstitial space 170 between the primary and secondary containments 168 and 169. Leakage of the contained substance into this space is detected and evaluated in the manner discussed above with a containment vessel monitoring and leak detection system of the type illustrated in the drawing and discussed above. This system is represented in FIG. 7a by the lower, inlet end 107 of high side vacuum line 100 and the lower, inlet end 127 of low side vacuum line 125.

Installation 167, however, differs from those shown in FIGS. 1 and 5 in that the secondary containment or envelope 169 is surrounded by, and encapsulated in, a second, outer envelope 172. This envelope may be fabricated from the same material as secondary containment 169. Like the latter, it has a bounding portion 174 and integral nubbins 176 which cooperate with the bounding part 177 of secondary containment 169 to provide between it and the outer envelope 172 a second interstitial space 178. A second leak detection system, which may, essentially, be physically identical to leak detection system 28, monitors this interstitial space 178 and detects the release of substance from the surrounding environs 180 into that space by way of leaks in outer envelope 172.

Figure 7A:
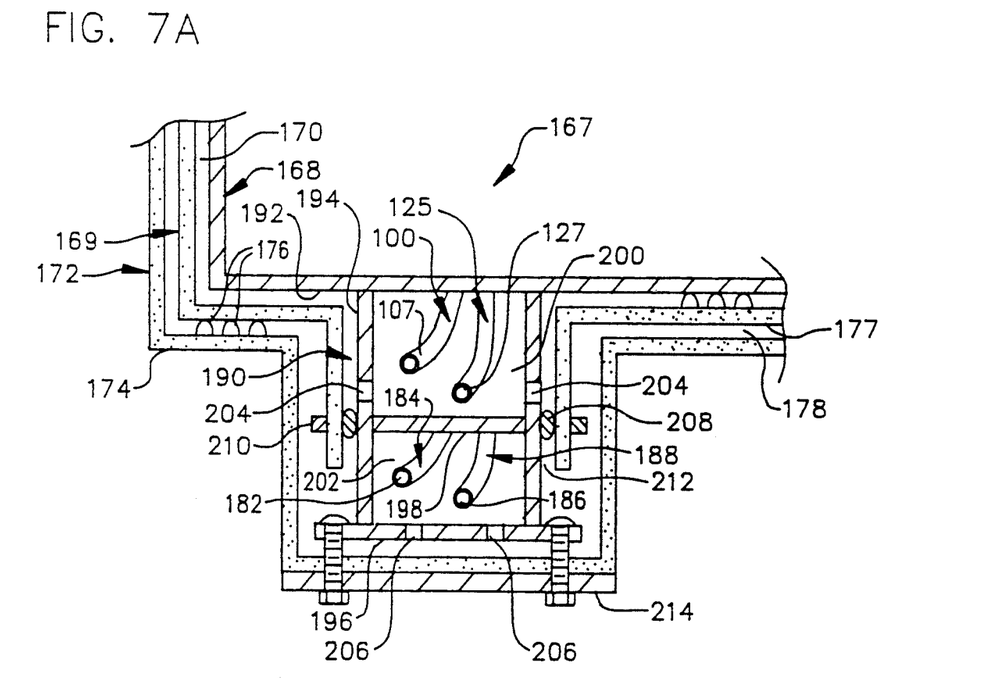
FIG. 7A is a fragment of FIG. 7, drawn to a larger scale.

This second containment monitoring and leak detection system—which in actual practice may be combined with that discussed in the preceding paragraph—is represented in FIG. 7a by the lower, inlet end 182 of a high side vacuum line 184 and the lower, inlet end 186 of a low side vacuum line 188.

Installation 167 also has a sump 190 designed to accommodate the two separate monitoring and leak detection systems. This sump is welded or otherwise attached to the lower side 192 of primary containment vessel 168. It has: (a) a cylindrical component 194, (b) a platelike bottom wall 196 at the lower end of component 194, and (c) a partition 198 dividing the sump into an upper chamber 200 and a lower chamber 202. Upper sump chamber 200 houses the inlet ends 107 and 127 of high side and low side vacuum lines 100 and 125. It communicates with the interstitial space 170 between primary containment vessel 168 and secondary containment vessel 169 through apertures 204 in cylindrical sump component 194. Lower sump compartment 202, in which the inlet ends 182 and 186 of high side and low side vacuum lines 184 and 188 of the second monitoring and leak detection system are found, communicates with the interstitial space 178 between secondary containment 169 and outer envelope 172. That communication is provided by the apertures 206 in bottom wall 196 of the sump.

A seal 208 and compression ring 210 keep contained substance released to interstitial space 170 from leaking past the gap 212 between sump component 194 and secondary containment 169. A plate 214 bolted or otherwise fixed to the bottom wall 196 of sump 190 protects that part of outer envelope 172 extending around the bottom of the sump.

Similar seal/compression ring sets respectively identified in FIG. 7 by reference characters 216, 218, 220, and 222 respectively: (1) seal secondary containment 169 to a cylindrical fitting 224 surrounding the tubular riser 226 of vent/fill system 228, (2) seal outer envelope 172 to riser 226, (3) seal secondary containment 169 to manway 230, and (4) seal outer envelope 172 to the manway. An additional seal 232 surrounding the riser 226 of vent/fill system 228 keeps contained substance 24 from leaking through the gap 234 between riser 226 and the surrounding cylindrical support 224.

Many tanks for contaminants and other harmful substances are fabricated from relatively porous materials such as concrete. In installations employing containment vessels of that character, the porous containment vessel may, in accord with the principles of the present invention, be provided a liner to keep contained substance from leaking through the pores of the porous containment. Typically, the pore sealing liner is located inside the porous containment and the latter is encapsulated in the second, containment providing liner or envelope. In this case, the porous vessel/sealing liner combination serves as the primary containment and cooperates with the other, secondary containment providing liner to define the requisite, small, controlled volume between the primary and secondary containments.

Alternatively, the containment providing liner can be located inside of the lined, porous vessel. In this case, it serves as the primary containment; and the interstitial space is bounded by the two liners. The pore sealing liner backed by the porous vessel serves as the secondary containment.

Figure 8:
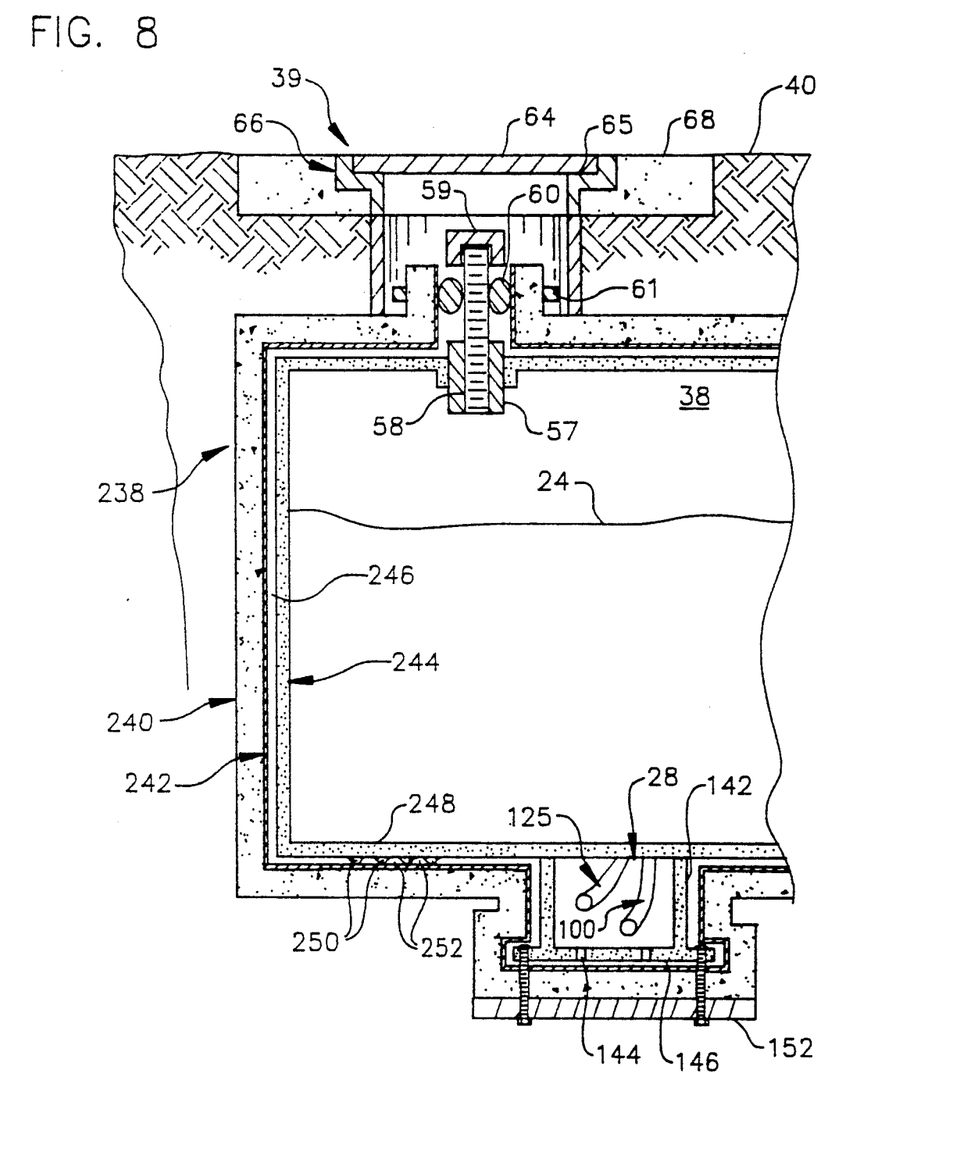
FIG. 8 is yet another embodiment of the present invention, in this case one with a storage system having a primary or secondary containment of a porous material such as concrete.

An installation of the character just described is depicted in FIG. 8 and identified by reference character 238. The relatively porous, secondary containment vessel is identified by reference character 240; the pore sealing inner liner by reference character 242; that inner liner which serves as the primary containment by reference character 244; and the interstitial space by reference character 246. Primary containment liner or envelope 244 is of the same character as the other interstitial space providing, inner and outer envelopes discussed above. It has a bounding portion 248 and nubbins or other features 250 which contact pore sealing liner 242 and cooperate with the latter to define the interstices 252 making up interstitial space 246.

Figure 9:
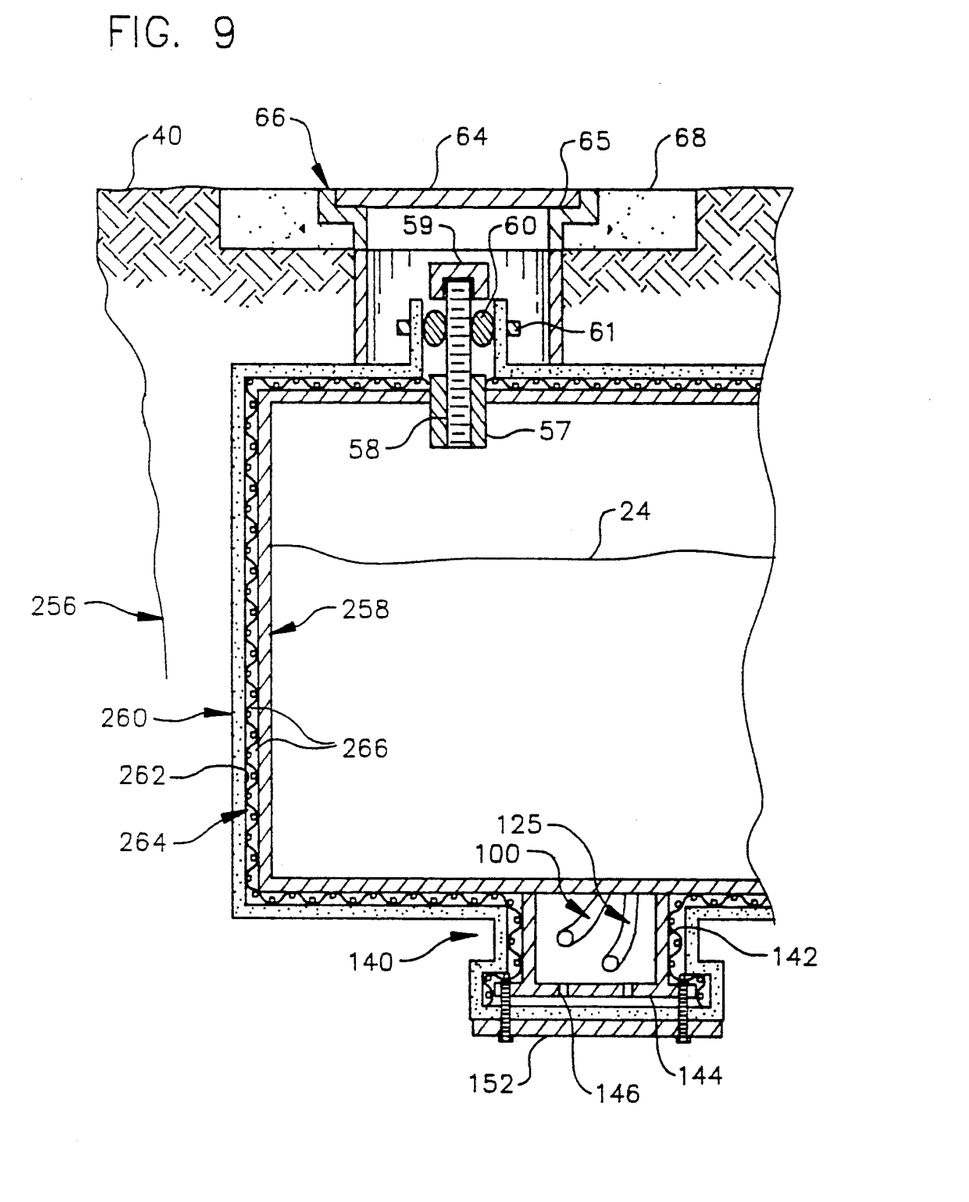
FIG. 9 is a fragmentary view of a fifth embodiment of the invention which differs from the other illustrated embodiments in that it employs a different technique for creating a small, controlled volume in those spaces into which contained substances are released and/or those spaces into which substances can leak from the surrounding environs.

In those embodiments of the invention thus far described, the controlled volume space between primary and secondary containments required for monitoring and leak detection has been provided with an embossed, or otherwise figured, inner or outer liner. It is by no means necessary, however, that the controlled volume space be provided in this particular manner. FIG. 9, for example, depicts an installation 256 with an inner, tanklike, primary containment 258 spaced from a secondary, outer containment 260. A controlled, small volume, interstitial space 262 is provided between containments 258 and 260 by a layer of drainage mat or filter fabric 264. The filter fabric fills the gap between the primary and secondary containments and reduces its volume to one made up of multitudinous, communicating, interstices 266. Filter fabric is a commercial product available from St. James Paper Co., Celanese, Dow, and others and the drainage net is available from Tensar, Gundle, or others and will accordingly not be described in detail herein.

The invention may be embodied in forms other than those disclosed above without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A method of measuring the leakage from a primary containment means which comprises the steps of:
 so arranging a vessel and an essentially fluidtight envelope as to provide primary and secondary containment means and a space of controlled volume between said containment means;
 predicting the rate at which a substance released from the primary containment means will collect in said space in the absence of a leak in the primary containment means;
 employing a high vacuum system to withdraw from said space the contained substance collected therein;
 comparing the amount of the substance removed from said space with the amount of the substance predicted to have been collected in said space in the absence of a leak;

generating an advisory warning of a possible leak in the primary containment means if the amount actually removed exceeds to a determined extent the amount predicted to have been collected; and employing a second low vacuum system to maintain in the space between the primary and secondary containment means a negative pressure which is of sufficient magnitude to keep the primary and secondary containment means in firm contact, thereby keeping the controlled volume space constant and making possible the accurate detection of very small leaks.

2. A method as defined in claim 1 in which the frequency and/or duration of the periods required to remove the collected contained substance from the space between the primary and secondary containment means is employed as a measure of the volume of collected contained substance removed from said space.

3. A method as defined in claim 2 in which the collected substance is pumped from the space between the primary and secondary containment means and it is the frequency with which the pump runs and/or the duration of the periods for which it runs that are employed as a measure of the contained substance actually removed from said space.

4. A method as defined in claim 1 in which the volume of the space between the primary and secondary containment means is small in comparison to the volume of the primary containment means and a small change in the release of a contained substance from the primary containment means will accordingly result in a large and readily detectable change in said space.

5. A method as defined in claim 1 in which a programmed data processing means is employed to compare the predicted accumulation of the contained substance in the space between the primary and secondary containment means with the amount of substance actually accumulated in and removed from said space and output the advisory warning of a possible leak if the actually accumulated and removed amount exceeds the predicted amount.

6. A method as defined in claim 1 which includes the steps of:
withdrawing from the controlled volume spaced fluid accumulated therein;
analyzing fluids withdrawn from said space for content and/or for contamination by substances from the surrounding environment; and
generating an advisory warning of a possible leak if the analyzed fluid is found to contain a substance other than one expected to be released in the absence of a leak from the primary containment means or the surrounding environs to the controlled volume space.

7. A system for detecting the leakage of fluid from a primary containment means into a space of controlled, essentially constant volume between the primary containment means and a secondary containment means, said system comprising:
means for periodically evacuating from said space contained substance collected in that space;
means for comparing the amount of contained substance actually evacuated from the space between the primary containment means and the secondary containment means with the amount of the contained substance that would be expected to collect in said space in the absence of a leak and providing an advisory warning of a possible leak if the amount of the contained substance actually evacuated from said space exceeds the amount of substance expected to collect in that space; and
a vacuum means for independently maintaining in said space of controlled volume a negative pressure which is of sufficient magnitude to keep the primary and secondary containment means in contact and thereby keep the volume of said space essentially constant.

8. A system as defined in claim 7 which includes:
means for withdrawing from the controlled volume space fluid accumulated therein; and
means for analyzing fluids withdrawn from said space for content and/or for containment by substances from the surrounding environment;
the advisory warning providing means having the capability of generating an advisory warning of a possible leak if the analyzed fluid is found to contain a substance other than one expected to be released in the absence of a leak from the primary containment means or the surrounding environs to be controlled volume space.

9. A system as defined in claim 7 in which one of said containment means has a bounding means and means so spacing the bounding means from the other containment means as to create a network of interconnected interstices constituting a space of small, controlled volume between said primary and secondary containment means.

10. A system of defined in claim 7 which has a catchment on the lower side of the primary containment means and communicating with the space between that means and the secondary containment means in which contained substance released from the primary containment means into said space can collect.

11. A system as defined in claim 7 in which the means for evacuating collected contained substance from the space between the primary containment means and the secondary containment means comprises means for pumping collected substance from said space.

12. A system as defined in claim 7:
in which one of said containment means is an envelope or liner, and
which has means for evacuating the space between the primary containment means and the secondary containment means to a negative pressure in the range of 5 to 10 psi, thereby making is possible to readily detect leaks in the envelope or liner.

13. A system as defined in claim 7 in which the primary containment means is a liner in the secondary containment means.

14. A system as defined in claim 13:
which has a porous containment means and an impermeable containment means; and
in which there is an impervious liner between the porous and impermeable containment means and the controlled volume space is defined by said impervious liner and the impermeable containment means.

15. A system as defined in claim 7 which has a standpipe with one section providing a catchment for contained substance released from the primary containment means into the space between the primary and secondary containment means, the means for evacuating contained substance comprising a vacuum line with an inlet in the standpipe.

16. A system as defined in claim 7 which has a catchment on the lower side of the primary containment means in which contained substance released into the space between the primary and secondary containment means can collect, the means for evacuating contained substance comprising a vacuum line having an inlet communicating with said catchment.

17. A system as defined in claim 7 which has:
an envelope encapsulating the secondary containment means and providing a second space of controlled, essentially constant volume between the envelope and the secondary containment means;
means for periodically evacuating from the second space between the secondary containment means and the encapsulating envelope substance released into that space from the surrounding environs and collected in the space; and
means for comparing the amount of substance actually evacuated from the space between the secondary containment means and the encapsulating envelope with the amount of the substance that would be expected to collect in said space in the absence of a leak and providing an advisory warning of a possible leak in the encapsulating envelope if the amount of the contained substance actually evacuated from said second, controlled volume space exceeds the amount of substance expected to collect in that space.

18. A system as defined in claim 17 in which one of the secondary containment means and the encapsulating envelope has means for so spacing said secondary containment means and said envelope as to create a network of interconnected interstices making up the controlled volume space between the secondary containment means and the encapsulating envelope.

19. A system as defined in claim 18 which includes means for maintaining a negative pressure in the space between the secondary containment means and the encapsulating envelope at a level high enough to keep the said envelope and said secondary containment means in contact and thereby accurately control the volume of said space.

20. A system as defined in claim 17 which has a catchment communicating with the space between the secondary containment mean and the encapsulating envelope in which contained substance released from the surrounding environs into said space can collect.

21. A system as defined in claim 17 in which the means for evacuating collected contained substance from the space between the secondary containment means and the encapsulating envelope comprises means for pumping collected substance from said space.

22. A system as defined in claim 21 in which the means for comparing the amount of contained substance actually evacuated from the space between the secondary containment means and the encapsulating envelope and the amount that is predicted to have been collected therein comprises means for comparing the duration of the periods for which the pumping means is operated and/or the frequency of operation of the pumping means with the duration of the periods for which the pumping means would be expected to operate and/or the expected frequency of operation in the absence of contained substance leaking from the surrounding environs into said second, controlled volume space.

23. A system as defined in claim 17 has a material with communicating interstices filling the interval between the secondary containment means and the encapsulating envelope and providing the controlled volume space between the secondary containment means and the encapsulating envelope.

24. A system as defined in claim 7 which has a material with communicating interstices filling the interval between the primary containment means and the secondary containment means and providing the controlled volume space between the primary and secondary containment means.

25. A system as defined in claim 7 in which the means for evacuating collected contained substance from the space between the primary containment means and the secondary containment means comprises a vacuum pump.

26. A system as defined in claim 7 in which the primary containment means is a liner in the secondary containment means.

27. A system as defined in claim 7:
which has a porous containment means and an impermeable containment means, and
in which there is an impervious liner between the porous containment means and the impermeable containment means and the controlled volume space is defined by the impervious liner and the impermeable containment means.

28. A system as defined in claim 7 which has:
an envelope encapsulating the secondary containment means and providing a second space of controlled, essentially constant volume between the envelope and the secondary containment means;
a vacuum pump for creating a negative pressure in said second, controlled volume space;
means for predicting the frequency and/or duration of the periods the vacuum pump will operate to keep the negative pressure in said second space at the level it would be absent pressure increases not related to leakage of a substance thereinto from the surrounding environs;
means for ascertaining the frequency and/or duration of the periods in which the vacuum producing means actually operates; and
means for comparing the actual and predicted operation of the vacuum pump and outputting an advisory if the actual operation of the vacuum pump exceeds the predicted operation of the vacuum pump.

29. A leak detection system as defined in claim 28 comprising means for identifying the magnitude of a leak in the encapsulating envelope which includes:
means for evacuating from the second, controlled volume space between the secondary containment means and the encapsulating envelope contained substance released to that space;
means for measuring the amount of contained substance evacuated from said space; and
means for ascertaining the difference between the amount of substance evacuated from said space and the amount of substance predicted to have been collected therein and for generating an output in which the magnitude of a leak is related to said volume difference.

30. A system as defined in claim 28:
which includes means for evacuating from the space between the secondary containment means and the encapsulating envelope substance released to that space, and
in which the means for ascertaining the difference between the amount of contained substance actually evacuated from the space between the secondary containment means and the encapsulating envelope and the amount of contained substance that is predicted to have been collected therein comprises means for comparing the duration and/or frequency of the periods for which the substance evacuating means is operated with the duration and/or frequency of the periods for which said means would be operated in the absence of contained substance leaking from the surrounding environs into said second, controlled volume space.

31. A system as defined in claim 28 in which at least the secondary containment means or the encapsulating envelope has means so spacing the secondary containment means and the encapsulating envelope as to create a network of interconnected interstices constituting the second space of small, controlled volume between said envelope and said secondary containment means.

32. A system as defined in claim 28 which includes means for maintaining a negative pressure in the second, controlled volume space between the secondary containment means and the encapsulating envelope at a level high enough to keep the envelope and the secondary containment means in contact and thereby accurately control the volume of said space.

33. A system as defined in claim 28 which has a catchment, on the lower side of the primary containment means and communicating with the space between the secondary containment means and the encapsulating envelope in which contained substance released from the encapsulating envelope into that space can collect.

34. A system as defined in claim 7 in which: the means for comparing the amount of contained substance actually evacuated from the space between the primary containment means and the secondary containment means and the amount that would be expected to have been collected therein comprises a data processing means for comparing the duration of the periods for which the pumping means is operated and/or the frequency of operation of the pumping means with the duration of the periods for which the pumping means would be expected to operate and/or the expected frequency of operation in the absence of contained substance leaking form said primary containment vessel into said space, said data processing means having means for storing data identifying the duration of the periods for which the pumping means would be expected to operate and/or the expected frequency of operation in the absence of contained substance leaking from said primary containment vessel into the space between the primary and secondary containment means.

35. A method of measuring the leakage from a primary containment means which comprises the steps of:

so arranging a vessel and an essentially fluidtight envelope as to provide primary and secondary containment means and a space of controlled volume between said containment means;

predicting the rate at which a substance released from the primary containment means will collect in said space in the absence of a leak in the primary containment means; and generating an advisory warning of a possible leak in the primary containment means if the amount actually removed exceeds to a determined extent the amount predicted to have been collected;

the amount of contained substance expected to collect in the controlled volume space between the primary and secondary containment means being predicted by: calculating the rate at which contained substance would be expected to be released from the primary containment means to the space of controlled volume by permeation, storing the thus calculated trend information, and projecting from the stored trend information a time-related increase in the volume of the contained substance in the controlled volume space between the primary and secondary containment means attributable to the release of contained substance from the primary containment means to said controlled volume space by permeation.

36. A system for detecting the leakage of fluid from an essentially rigid primary containment means into a space between the primary containment means and a flexible secondary containment means in which the primary containment means is encapsulated, said system comprising:

means for maintaining a negative pressure in the space between the primary containment means and the secondary containment means at a level high enough to keep the primary and secondary containment means in contact and thereby accurately control the volume of the space therebetween;

means for periodically evacuating from the space between the primary containment means and the secondary containment means contained substance collected in that space; and means for comparing the amount of contained substance actually evacuated from the space between the primary containment means and the secondary containment means with the amount of the contained substance that would be expected to collect in said space in the absence of a leak and providing an advisory warning of a possible leak if the amount of the contained substance actually evacuated from said space exceeds the amount of substance expected to collect in that space.

* * * * *